United States Patent
Gatz

(10) Patent No.: US 7,320,349 B2
(45) Date of Patent: Jan. 22, 2008

(54) TREE HARVESTER

(75) Inventor: Michael C. Gatz, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 333 days.

(21) Appl. No.: 10/740,148

(22) Filed: Dec. 18, 2003

(65) Prior Publication Data

US 2005/0133115 A1 Jun. 23, 2005

(51) Int. Cl.
*A01G 23/08* (2006.01)
*B23Q 15/20* (2006.01)

(52) U.S. Cl. ............... 144/335; 144/356; 144/391; 144/4.1

(58) Field of Classification Search ............ 144/356, 144/357, 4.1, 34.1, 382, 335, 336, 391, 392, 144/394; 56/10.2 R, 10.2 D, 10.2 E, 10.2 F, 56/DIG. 15; 701/2, 50; 83/76.8, 364, 365, 83/368, 370, 795
See application file for complete search history.

(56) References Cited

U.S. PATENT DOCUMENTS

| | | | |
|---|---|---|---|
| 3,688,821 A * | 9/1972 | McColl ............. | 144/4.1 |
| 3,881,533 A | 5/1975 | Savage et al. | |
| 3,924,667 A | 12/1975 | McKenzie | |
| 3,970,124 A | 7/1976 | Hamilton | |
| 4,044,806 A * | 8/1977 | Savage et al. ....... | 144/338 |
| 4,243,258 A | 1/1981 | Dauwalder | |
| 4,580,251 A | 4/1986 | Koukovinis | |
| 6,135,175 A | 10/2000 | Gaudreault et al. | |
| 6,181,273 B1 | 1/2001 | Heide et al. | |
| 6,182,725 B1 * | 2/2001 | Sorvik ............. | 144/335 |
| 6,289,957 B1 | 9/2001 | Kare | |
| 6,435,235 B1 | 8/2002 | Hicks | |
| 6,586,054 B2 * | 7/2003 | Walsh ............. | 427/430.1 |

(Continued)

FOREIGN PATENT DOCUMENTS

EP 0974262 A1 * 1/2000

(Continued)

OTHER PUBLICATIONS

U.S. Appl. No. 09/501,726, filed Feb. 10, 2000, Titled "Method and Apparatus for Controlling Harvesting of Trees" Inventor Alster (Now Abandoned).

(Continued)

*Primary Examiner*—Shelley M. Self
(74) *Attorney, Agent, or Firm*—D. James Barnes; Richard Chang

(57) ABSTRACT

A method and system for operating a tree harvesting machine including a tree harvesting tool are provided. The method may include identifying a tree to be harvested, generating one or more tree position signals indicative of a position of the tree, and controlling movement of the tree harvesting tool toward the tree as a function of the one or more tree position signals. The system may include a tree position sensor operable to generate one or more tree position signals indicative of a position of a tree. The system may further include a controller operable to receive the one or more tree position signals. The controller may be further operable to generate one or more tool control signals for controlling movement of the tree harvesting tool toward the tree as a function of the one or more tree position signals.

15 Claims, 3 Drawing Sheets

U.S. PATENT DOCUMENTS

| | | | |
|---|---|---|---|
| 6,789,589 B2 * | 9/2004 | Kettunen et al. | 144/357 |
| 7,072,764 B2 * | 7/2006 | Donath et al. | 701/200 |
| 2004/0250908 A1 * | 12/2004 | Hicks | 144/335 |

FOREIGN PATENT DOCUMENTS

| | | |
|---|---|---|
| SE | 9604135-5 | 5/1998 |
| SE | 0003067-6 A | 3/2002 |
| SE | 523774 | 5/2004 |

OTHER PUBLICATIONS

"Smart Swing Cutter Machine", Jan. 12, 2000 Research Disclosure 429, 038 Emsworth Design Inc., NY.

* cited by examiner

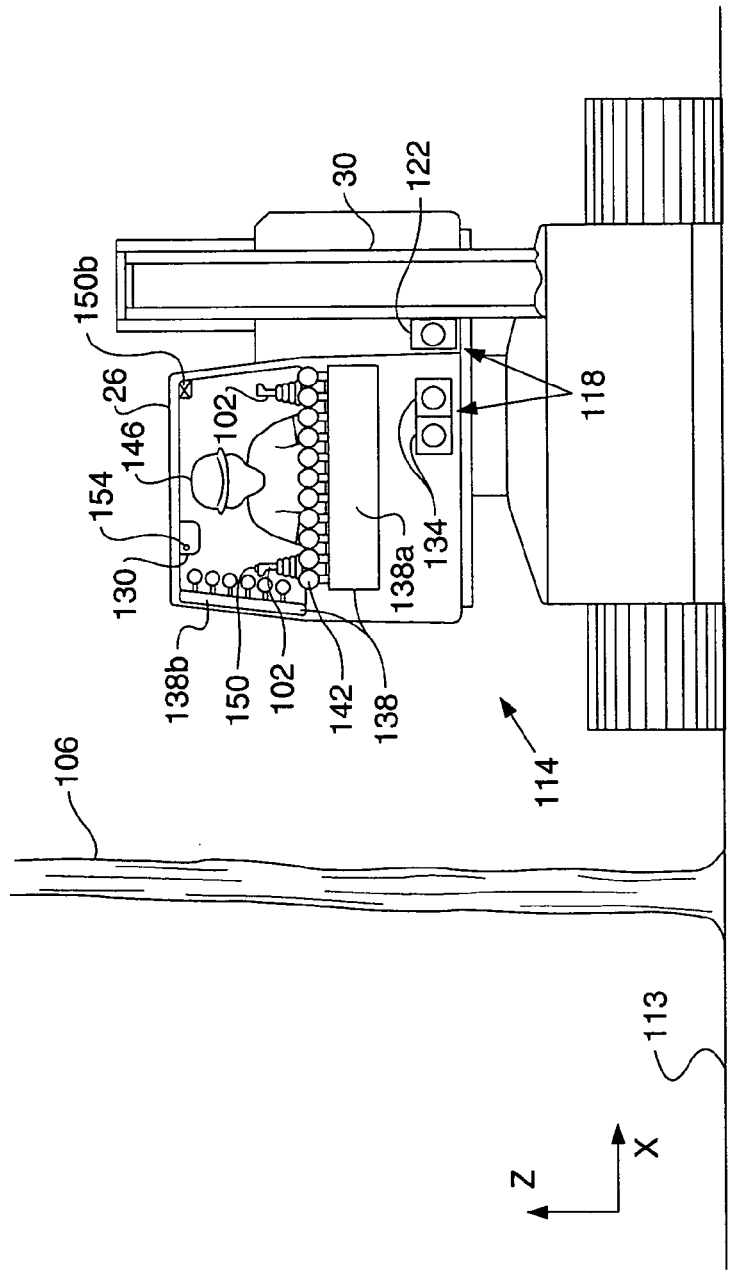

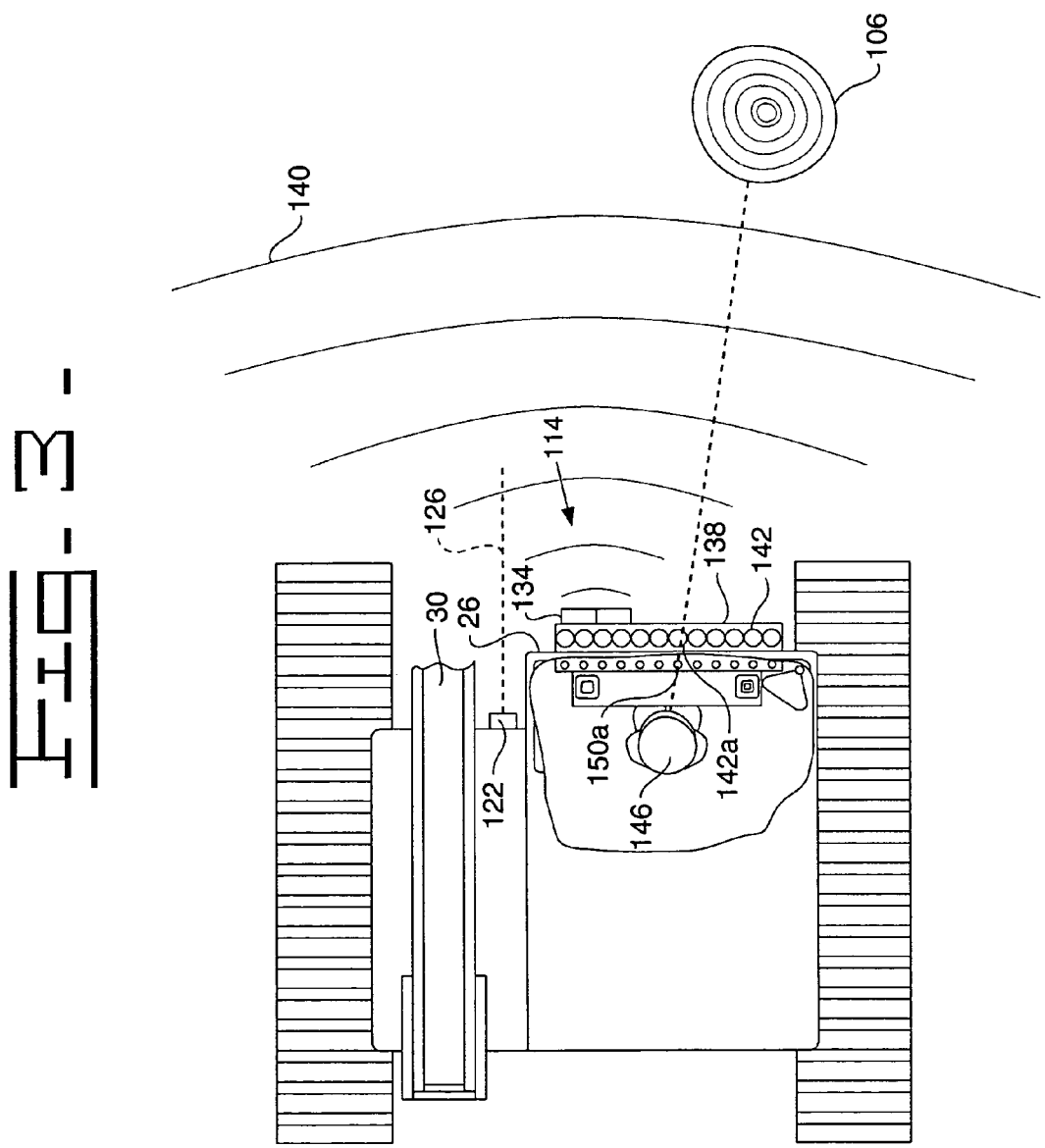

TREE HARVESTER

TECHNICAL FIELD

The present device relates generally to tree harvesting machines and, more particularly, to systems and methods for operating tree harvesting machines.

BACKGROUND

Tree harvesting machines, such as felling bunchers and felling processors, are often used to harvest trees one tree at a time and may be operated over a single work cycle to harvest many trees during the work cycle. The operation of such tree harvesting machines over a work cycle may demand high levels of operator skill and concentration and may demand precise operator control for extended periods. For example, an operator of a tree harvesting machine may be required to accurately move a tree harvesting tool, which may be attached to the tree harvesting machine, into an appropriate tree-cutting position many times over the course of a work period. Such repetitive positioning of the tree harvesting tool over the course of a work period can cause operator fatigue, which may lead to decreased operator productivity.

Various systems have been created to reduce operator fatigue or to increase operator productivity during tree harvesting operations. For example, U.S. Pat. No. 3,924,667, issued to McKenzie, discloses a compact tree clamp and automatic sequence control for a tree length harvester. The McKenzie reference discloses an automatic sequence control that includes a plate on a tree clamp that may be depressed by a subject tree to initiate processing steps without requiring an operator's attention.

Prior systems, however, may suffer from various disadvantages. For example, prior systems may still require high levels of operator control and precision when moving a tree harvesting tool into an appropriate tree harvesting position. Moreover, prior systems may lack automated control systems that may decrease operator fatigue and that may maintain or increase operator productivity over the course of a work period.

The present invention is directed to overcoming one or more disadvantages associated with prior tree harvesting systems and methods.

SUMMARY OF THE INVENTION

In one aspect of the present invention, a method for operating a tree harvesting machine including a tree harvesting tool is provided. The method may include identifying a tree to be harvested, generating one or more tree position signals indicative of a position of the tree, and controlling movement of the tree harvesting tool toward the tree as a function of the one or more tree position signals.

In another aspect of the present invention, a system for controlling movement of a tree harvesting machine including a tree harvesting tool is provided. The system may include a tree position sensor operable to generate one or more tree position signals indicative of a position of a tree. The system may further include a controller operable to receive the one or more tree position signals. The controller may be further operable to generate one or more tool control signals for controlling movement of the tree harvesting tool toward the tree as a function of the one or more tree position signals.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments or features of the invention and, together with the description, serve to explain the principles of the invention. In the drawings.

FIG. 2 is a front elevational view of the tree harvesting machine of FIG. 1, wherein the tree harvesting tool is not shown; and FIG. 3 is a plan view of the tree harvesting machine of FIG. 1, wherein the tree harvesting tool is not shown.

Figure 1:
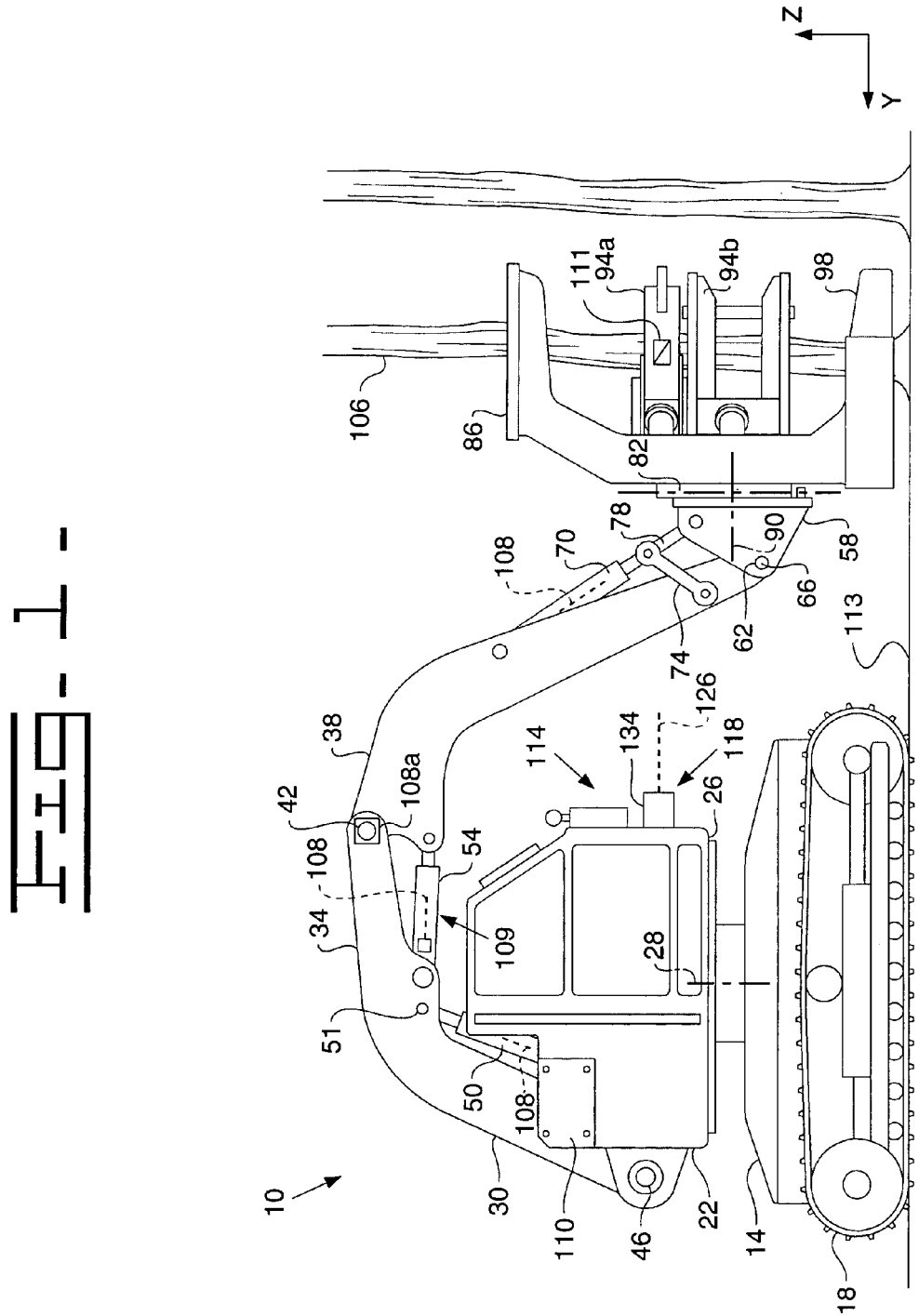
FIG. 1 is a side elevational view of a tree harvesting machine according to an embodiment of the present invention.

Although the drawings depict exemplary embodiments or features of the present invention, the drawings are not necessarily to scale, and certain features may be exaggerated in order to better illustrate and explain the present invention. The exemplifications set out herein illustrate exemplary embodiments or features of the invention and such exemplifications are not to be construed as limiting the scope of the invention in any manner.

DETAILED DESCRIPTION

Reference will now be made in detail to embodiments or features of the invention, examples of which are illustrated in the accompanying drawings. Wherever possible, the same or corresponding reference numbers will be used throughout the drawings to refer to the same or corresponding parts.

An exemplary tree harvesting machine 10 is illustrated in FIG. 1 and includes a track machine 14 with an endless track undercarriage 18 and a superstructure 22, which includes an operator's station 26. It should be appreciated that the tree harvesting machine 10 could be movable via a wheeled undercarriage (not shown) rather than a track undercarriage. The superstructure 22 is rotationally mounted atop the track machine 14 for rotational movement with respect to the track machine 14 about a rotational axis 28. It should further be appreciated that the harvesting machine 10 could be an articulated machine as known in the art.

An articulated boom 30 includes a rear section 34 and a front section 38 interconnected by a pivot pin 42. The rear section 34 is pivotally connected to the superstructure 22 for vertical swinging movement by a pivot pin 46. The rear section 34 of the boom 30 is raised and lowered by a hydraulic actuator 50 positioned between the rear section 34 and the superstructure 22, and the front section 38 of the boom 30 is pivoted relative to the rear section 34 by a double acting hydraulic actuator 54 positioned between the front section 38 and the rear section 34.

A mounting structure 58 has its lower end pivotally connected to the lower end of the boom section 38 by a pivot pin 62 for swinging movement about a transverse pivot axis 66. The mounting structure 58 is pivoted about the axis 66 by a hydraulic actuator 70. A cylinder end of the actuator 70 is pivotally connected to the front section 38 of the boom 30, and a rod end of the hydraulic actuator 70 is pivotally connected to the upper end of a tilt lever 74 and to the rear end of a tilt link 78. The lower end of the tilt lever 74 is pivotally connected to the boom section 38, and the forward end of the tilt link 78 is pivotally connected to the upper end of the mounting structure 58.

A coupling 82 is provided to pivotally support a tree harvesting tool 86, such as a tree harvester head structure in the form of a felling head, for pivotal movement about a bearing axis 90 lying in a vertical plane at right angles to the axis 66. The tree harvester head structure 86 includes a pair of fluid power operated tree grabbing arms 94A, 94B and a saw 98 for cutting the trunk of a tree.

One or more control joysticks 102 (FIG. 2) within the operator's station 26 may be used by an operator, as known in the art, to move the tree harvester head structure 86 from a position remote from a tree 106 to a location proximate the tree 106 and into a tree cutting position (as shown in FIG. 1). For example, the joysticks 102 may be operably connected with a controller 110 disposed on the superstructure 22 behind the operator's station 26. The controller 110 may be operably connected with various motors and actuators associated with the boom 30 and other components of the tree harvesting machine 10. Electrical signals from the joysticks 102 may be communicated to the controller 110, and the controller 110 may be operable to responsively control the various actuators and motors to move the machine 10 via the track undercarriage 18, rotate the superstructure 22 with respect to the track machine 14, move the articulated boom 30 to a position proximate the tree 106 and into a tree cutting position, and operate the saw 98 and grabbing arms 94A, 94B to complete a tree harvesting operation.

It should be appreciated that one or more of the actuators 50, 54, 70 may be operably coupled with one or more position sensor(s) (generally indicated as 108 in FIG. 1) generally known in the art, which sensor(s) may be mounted internal to the actuator(s) 50, 54, 70 (as shown in FIG. 1) or external to the actuators 50, 54, 70, as desired. For example, the sensor(s) 108 may include known linear displacement transducer technology that is operable to determine the position of the piston and rod assemblies of the respective actuators 50, 54, 70 with respect to the cylinder bodies of the respective actuators 50, 54, 70, as known in the art. One exemplary position sensor 108 is described in U.S. Pat. No. 6,509,733 to Blubaugh et al., entitled "Fluid Cylinder With Embedded Positioning Sensor," and may use magnetostrictive technology to determine the position of a piston and rod assembly with respect to a predetermined location. It should be appreciated that alternative or additional position sensors known in the art, such as cable extension transducers or "yo-yo sensors" for example, may be used with the present invention. One example of a cable extension transducer (not shown) includes a transducer housing that encloses a spring-loaded spool about which is wrapped a flexible stainless steel cable. The transducer housing may be mounted to a fixed surface proximate an end of an actuator (such as on the superstructure 22 proximate a cylinder end of the actuator 50), and one end of the cable may be mounted to a movable object proximate the rod end of the actuator (such as proximate the connecting pin 51 of the actuator 50). As the object (51) moves relative to the fixed surface (22), the spool rotates to release or retract the cable as necessary and the transducer produces an electrical signal that is proportional to the rotation of the spool and the extension or retraction distance of the cable. It should also be appreciated that, additionally or alternatively, one or more rotary position sensors 108a may be coupled at or proximate one or more of the pin locations to determine the angular orientation of various machine components relative each other. For example, a rotary position sensor 108a may be coupled at or proximate the pivot pin 42 to sense the angular orientation of the front and rear sections 38, 34 relative each other.

One or more position sensors, such as sensor(s) 108, 108a, or other sensors known in the art, either alone or in combination with other sensors, may form a machine position sensor 109, which may be operably connected with the controller 110, and which may be operable to transmit machine position signal(s) to the controller 110 indicative of position(s) of the actuator(s) 50, 54, 70 and/or the various components of the machine 10. The controller 110 may be operable to receive these position signals and responsively determine (via geometric calculations for example) a position of the tree harvester head structure 86, for example with respect to the superstructure 22. It should be appreciated that alternative or additional position indicating mechanisms known in the art may form the machine position sensor 109 and may be used to indicate the position of the tree harvester head structure 86 and to communicate indicative signals to the controller 110. It should further be appreciated that the machine position sensor 109 may produce signals indicative of a position of one or more machine components relative a reference location, for example a predetermined reference location on the superstructure 22. Alternatively or additionally, the machine position sensor 109 may produce signals indicative of a position of one or more machine components relative a work site 113, for example if the machine position sensor 109 includes one or more Global Positioning System (GPS) sensors 111 (FIG. 1) coupled with the one or more machine components.

A tree position sensor 114 may be operably connected with the controller 110. The tree position sensor 114 may include a distance sensor 118, such as a laser-type distance sensor or an ultrasonic-type distance sensor, which may be operable to generate one or more tree position signals indicative of a position of the tree 106, for example with respect to the superstructure 22.

In one exemplary embodiment, a laser-type distance sensor 122 (FIG. 2) generally known in the art of distance sensing may be mounted to a forward portion of the superstructure 22 such that the sensor 122 is operable to transmit a laser signal (generally represented as line 126 in FIGS. 1 and 3) forward of the superstructure 22 and in general alignment with a path of the tree harvester head structure 86. When a tree 106 is identified for harvesting (for example, by an operator), the superstructure 22 (and the sensor 122) may be moved with respect to the tree 106—e.g., via rotation of the superstructure 22 with respect to the track machine 14—until the laser signal 126 is aimed directly at the target tree 106 and the sensor 122 generates a tree position signal indicative of the position of the tree 106. The tree position signal may comprise a distance portion indicative of a distance between the target tree 106 and a component (e.g., the superstructure 22) of the tree harvesting machine 10. In such an embodiment, the sensor 122 may be operably coupled with a visual indicator 130 (FIG. 2), such as a display screen disposed in view of the operator and operable to display a distance between the superstructure 22 and the tree 106. Thus, the visual indicator 130 may be operable to indicate to an operator that the sensor 122 (and the tree harvesting machine 10) has been properly aligned with the tree 106 for execution of a tree harvesting operation. The tree position signal produced by the tree position sensor 114 may be communicated to the controller 110. It should be appreciated that the controller 110 may be operable to receive the tree position signal and determine a distance between the tree 106 and the tree harvester head structure 86.

It should be appreciated that the tree position sensor 114 of FIGS. 1-3 may include, in addition or in alternative to the laser-type sensor 122, one or more ultrasonic-type sensors 134 generally known in the art of distance sensing. The ultrasonic sensors 134 may transmit sound waves forward of the superstructure 22 (as indicated generally by lines 140 in FIG. 3). In such an embodiment, the sensors 134 may generate one or more tree position signals indicative of a distance between a component of the machine 10 and the tree 106 even though the machine 10 may not be perfectly aligned with the tree 106 for performing a tree harvesting operation.

The tree position sensor 114 may include an alignment device 138, which may be provided on the machine 10 and which may be operable to generate a tree position signal indicative of the direction of the location of the tree with respect to a component of the tree harvesting machine 10. For example, a light bar 138a having a plurality of alignment points 142, such as lights or posts, thereon may be provided. The alignment points 142 may be positioned horizontally along a portion of the operator's station 26 and along a generally horizontal line of sight of an operator 146 of the machine 10. An operator 146 may identify a target tree 106 to be harvested and compare the direction of the tree 106 with the alignment points 142 to determine which of the alignment points 142 is located most precisely between the operator and the tree 106. For example, as illustrated in FIG. 3, alignment point 142a lies most precisely between the operator 146 and the tree 106. The operator may then identify the alignment point 142a, for example by pressing a button 150a in the operator's station 26 corresponding to the alignment point 142a. The button 150a may be operable to transmit a tree position signal, such as an alignment signal, to the controller 110 indicative of the alignment point 142a and therefore indicative of the direction of the location of the tree 106 relative the machine 10, the direction having, for example, a component in a generally horizontal plane.

It should be appreciated that the button 150a may be replaced by a voice-activated device 150b (FIG. 2) operable to (i) recognize an operator's voice command indicative of the alignment point 142a and (ii) transmit a corresponding alignment signal to the controller 110. The voice-activated device 150b may be any of a variety of voice-activated devices known in the art and may be operable, for example, to recognize a plurality of predetermined voice commands, each command corresponding to a particular alignment point 142 or direction. The alignment signal produced by the button 150a, by the voice-activated device 150b, or by some other alignment (or direction) indication device, thus may indicate a direction of the location of the tree 106 with respect to the tree harvesting machine 10. It should further be appreciated that the tree position sensor 114 may include alternative or additional alignment devices 138 or alignment points 142 operable to (i) indicate a direction of the location of the tree 106 with respect to the tree harvesting machine 10 and (ii) transmit a corresponding tree position signal to the controller 110.

The alignment device 138 of the tree position sensor 114 may include, additionally or alternatively, a generally vertically arranged light bar 138b operable in generally the same manner and including substantially similar components (e.g., alignment points) as the generally horizontally arranged light bar 138a described above. The operator may use the vertical light bar 138b to indicate a direction of the location of the tree 106 relative the machine 10, the direction having, for example, a component in a generally vertical plane. For example, the vertical light bar 138b may be used to indicate whether a target cutting or grabbing portion of the tree 106 sits at a higher or lower elevation on the work site 113 relative the machine 10.

The controller 110 may be operable to receive one or more of the tree position signals discussed above, determine an appropriate path for the tree harvesting tool 86 as a function of the tree position signal(s) and the machine position signal(s), and generate one or more tool control signals for controlling movement of the tree harvesting tool 86 toward the tree 106. For example, the controller 110 may be operable to generate tool control signals for controlling the various actuators 50, 54, 70 and other actuators or motors of the machine 10 to move the tree harvesting tool 86 from a location remote from the tree 106 toward the tree 106 and into a tree harvesting position (FIG. 1). Further, the controller 110 may be operable to control the operation of the saw 98 and the arms 94A, 94B to cut the tree and complete the tree harvesting operation.

Operation of the system may be controlled by software that is programmed into the controller 110 and/or various other components of the system. Alternatively or additionally, operation of the system may be implemented via hardware or any other known programming or operating technique. Creation of appropriate software based upon the description set forth herein is within the capabilities of one having ordinary skill in the programming arts.

INDUSTRIAL APPLICATIION

The present invention has advantageous use in tree harvesting machinery, particularly in moving a tree harvesting machine and a tree harvesting tool into an appropriate position for performing a tree harvesting operation. For example, when a laser-type sensor 122 is used with the machine 10, the machine 10 may be positioned so that a signal 126 from the sensor 122 is aimed at a target tree 106. The sensor 122 may be mounted to the machine 10 in such a way that when the sensor 122 is aligned to register a position of the tree 106, a path of the tree harvesting tool 86 is also aligned with the tree 106. The sensor 122 may produce a tree position signal indicative of the distance of the tree with respect to the superstructure 22, and the controller 110 may be operable to use the tree position signal and any machine position signal(s) transmitted by various position sensors on the machine 10 to determine a position of the tree 106 relative to the tree harvesting tool 86. The controller 110 may be operable to prompt the operator to perform a triggering operation by operating a trigger device 150 operable to produce a trigger signal and operable to communicate the trigger signal to the controller 110. For example, after the tree position signal has been communicated to the controller 110, and the controller 110 has determined a position of the tree 106 relative to the tree harvesting tool 86, the controller 110 may be operable to activate a light 154 (FIG. 2) in the operator's station 26 to prompt the operator to press an initiation button 150 operable to produce the trigger signal. The operator may then press the initiation button 150 to cause the controller 110 to execute, in response to the trigger signal, an automatic positioning sequence wherein the controller automatically generates tool control signal(s) for automatically moving the tree harvesting tool 86 toward the tree 106 and into a tree cutting position as a function of the tree position signal(s) and the machine position signal(s).

When ultrasonic sensor(s) 134 are used with the machine 10, the machine 10 may be positioned so that sound waves may be transmitted by the sensor(s) 134 toward a target tree 106. The sensor(s) 134 may transmit a tree position signal to the controller 110 indicative of the distance between the tree 106 and the machine 10. Moreover, an alignment device 138 may be provided and may be operable to transmit a tree position signal to the controller 110 indicative of a direction of the location the tree 106 (e.g., horizontally and/or vertically) with respect to the machine 10. The controller 110 may be operable to receive the tree position signal(s), determine an appropriate path for the tree harvesting tool 86 as a function of the tree position signal(s) and any machine position signal(s), and generate one or more tool control signals for controlling movement of the tree harvesting tool 86 toward the tree 106 and into a tree harvesting position.

It should be appreciated that the "position signals" produced by the machine position sensor 109 or the tree position sensor 114 may be indicative of a variety of positional information. For example and without limitation, such position signals may be indicative of: (i) locational information (for example x, y, and z coordinate information, as referenced in FIGS. 1 and 2) of a position—for example, the locational information of one or more machine components relative the work site 113 or relative a reference location such as a predetermined reference location on the superstructure 22; and/or (ii) orientation information (for example an angular orientation) of a position—for example, the angular orientation of one or more machine components relative the work site 113 or relative a reference component of the machine 10.

From the foregoing it will be appreciated that, although specific embodiments or features of the invention have been described herein for purposes of illustration, various modifications may be made without deviating from the spirit or scope of the invention. Other embodiments of the invention will be apparent to those skilled in the art from consideration of the specification and figures and practice of the invention disclosed herein. It is intended that the specification and disclosed examples be considered as exemplary only, with a true scope and spirit of the invention being indicated by the following claims and their equivalents. Accordingly, the invention is not limited except as by the appended claims.

What is claimed is:

1. A method for operating a tree harvesting machine including a tree harvesting tool and a controller, wherein the method is performed by the controller, the method comprising:
    identifying a tree to be harvested;
    generating one or more tree position signals indicative of a position of the tree, wherein generating one or more tree position signals includes generating a signal indicative of a direction of the location of the tree with respect to the tree harvesting machine;
    generating one or more tree harvesting tool position signals indicative of a position of the tree harvesting tool;
    determining the position of the tree relative to the tree harvesting tool;
    prompting an operator to provide a trigger signal when the controller has determined the position of the tree relative to the tree harvesting tool;
    receiving the trigger signal;
    executing an automatic positioning sequence in response to the trigger signal;
    automatically generating a tool control signal; and
    controlling movement of the tree harvesting tool toward the tree with the tool control signal as a function of the one or more tree position signals and the one or more tree harvesting tool position signals.

2. The method of claim 1, wherein the step of generating one or more tree position signals further includes generating a distance signal indicative of a distance between the tree and at least one component of the tree harvesting machine.

3. The method of claim 1, wherein the step of generating the signal indicative of the direction of the location of the tree with respect to the tree harvesting machine includes generating a signal indicative of at least one of a direction having a component in a generally horizontal plane and a direction having the component in a generally vertical plane.

4. The method of claim 1, wherein the step of generating one or more tree position signals includes generating a distance signal indicative of a distance between the tree and at least one component of the tree harvesting machine.

5. The method of claim 1, wherein the step of generating one or more tree position signals includes comparing the position of the tree with respect to one or more alignment points on the tree harvesting machine.

6. The method of claim 1, wherein the step of generating one or more tree position signals includes operating a position sensor in the direction of the tree.

7. The method of claim 6, wherein the step of operating the position sensor includes operating an ultrasonic sensor.

8. The method of claim 6, wherein the step of operating the position sensor includes operating a laser sensor.

9. The method of claim 1, wherein the tree harvesting machine includes an operator's station and a button disposed within the operator's station, wherein the trigger signal is generated when the button device is operated.

10. The method of claim 1, including causing the tree harvesting tool to cut the tree.

11. The method of claim 1, wherein the step of controlling movement of the tree harvesting tool toward the tree includes controlling movement of the tree harvesting tool from a location remote from the tree to a location proximate the tree.

12. The method of claim 1, wherein the one or more tree position signals is generated by an alignment device including a plurality of discrete alignment points for indicating the position of the tree relative to the tree harvesting machine.

13. The method of claim 12, wherein the position sensor is operable to communicate vertical and horizontal tree position data to the controller in response to an operator input associated with at least one of the plurality of alignment points.

14. The method of claim 13, wherein the alignment points are a plurality of vertically and horizontally arranged posts or lights.

15. The method of claim 1, wherein the tree harvesting machine includes an operator's station, wherein prompting the operator to provide the trigger signal includes activating a light disposed in the operator's station.

* * * * *